(12) United States Patent
Yip et al.

(10) Patent No.: US 7,414,798 B1
(45) Date of Patent: Aug. 19, 2008

(54) MAGNIFIER WITH SLIDABLE COVER

(75) Inventors: Gin Fai Yip, North Point (HK); Bryan Yip, Kowloon (HK)

(73) Assignees: Leading Extreme Optimist Industries, Ltd., Chai Wan (HK); Carson Optical, Inc., Hauppauge, NY (US)

( * ) Notice: Subject to any disclaimer, the term of this patent is extended or adjusted under 35 U.S.C. 154(b) by 0 days.

(21) Appl. No.: 11/715,737

(22) Filed: Mar. 7, 2007

(51) Int. Cl.
*G02B 27/02* (2006.01)

(52) U.S. Cl. ...................... 359/802; 359/810

(58) Field of Classification Search .......... 359/800, 359/802, 803, 808, 810, 813
See application file for complete search history.

(56) References Cited

U.S. PATENT DOCUMENTS

| | | | |
|---|---|---|---|
| 4,037,940 A * | 7/1977 | Yates et al. .............. 359/672 |
| D394,272 S | 5/1998 | Hon ........................... 359/813 |
| 5,754,349 A * | 5/1998 | Hon ........................... 359/813 |
| D494,692 S | 8/2004 | Jim ............................ 359/802 |
| 6,822,813 B2 * | 11/2004 | Jim ............................ 359/802 |

* cited by examiner

*Primary Examiner*—Mohammed Hasan
(74) *Attorney, Agent, or Firm*—Carmody & Torrance LLP

(57) ABSTRACT

A magnifying assembly comprising a housing; a magnifying lens coupled to the housing; and a cover slidable along the housing; wherein the cover is slidable relative to the housing in a first direction so as to cover at least part of the magnifying lens and slidable relative to the housing in a second direction so as to expose the magnifying lens. Preferably, the housing comprises a frame within which the magnifying lens is secured, and a battery compartment; wherein the frame and battery compartment are integrally formed.

13 Claims, 9 Drawing Sheets

MAGNIFIER WITH SLIDABLE COVER

BACKGROUND OF THE INVENTION

The present invention relates generally to magnifiers and in particular, to a magnifier with a slidable cover that achieves an improved overall compact construction, among providing other features and advantages.

The prior art has examples of "pop-up" type magnifiers, examples of which are described in U.S. Pat. Nos. 6,822,813; 5,754,249 and D394,272. However, it is believed that there are deficiencies in the prior art that would be desirable to overcome.

For example, it is believed that the prior art devices do not minimize the otherwise necessary dimensions of the device. In addition, the prior art devices are perceived to have more moving parts than desirable and therefore may be more likely to break or malfunction, due to wear or the like.

As such, it would be desirable to provide a magnifying assembly that includes a cover that is retractable relative to the housing so as to expose the magnifying lens, while the size of the magnifying assembly does not change, length or widthwise, as set forth herein. In this way, an improved magnifying assembly may be provided.

Accordingly, further advances in the art are believed to be desirable. In particular, a magnifying assembly that overcomes the aforementioned deficiencies and achieves the aforementioned and below mentioned objectives is desirable, and believed to be provided by the present invention.

SUMMARY AND OBJECTIVES OF THE PRESENT INVENTION

It is thus an objective of the present invention to overcome the perceived deficiencies in the prior art.

For example, it is an objective of the present invention to provide an improved magnifying assembly that includes a retractable cover so as to expose the magnifying lens, while maintaining a minimal requirement of the size of the assembly itself.

It is another objective of the present invention to provide an improved magnifying assembly that includes a retractable cover so as to expose the magnifying lens, thereby reducing the number of moving parts and reducing the likelihood of breakage or malfunction of the assembly.

Yet a further objective of the present invention is to provide an improved magnifying assembly that is easier and relatively less costly to manufacture.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

To overcome the perceived deficiencies in the prior art and to achieve the objects and advantages set forth above and below, the present invention is, generally speaking, directed to a magnifying assembly. In a preferred embodiment, the magnifying assembly comprises a housing; a magnifying lens coupled to the housing; and a cover slidable along the housing; wherein the cover is slidable relative to the housing in a first direction so as to cover at least part of the magnifying lens and slidable relative to the housing in a second direction so as to expose the magnifying lens. In the preferred embodiment, the housing comprises a frame within which the magnifying lens is secured, and a battery compartment; wherein the frame and battery compartment are integrally formed. Still preferably, neither the frame (nor the magnifying lens) slides relative to the battery compartment; whereby upon the exposure of the magnifying lens the length of the housing does not change from when the magnifying lens was covered by the cover.

In yet an alternative embodiment of the present invention, the magnifying lens need not be placed in the frame. For example, the lens may be "rimless" and merely be coupled to the housing by a plastic coupling member or a screw, just to name but two of many examples. The important point therefore is that the magnifying lens does not move relative to the housing, such as the battery compartment, regardless of how the lens may be coupled and/or secured to the housing. Such is to be contrasted with the prior art devices whereby the lens may "pop-up" relative to the battery compartment and/or housing.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Figure 1:
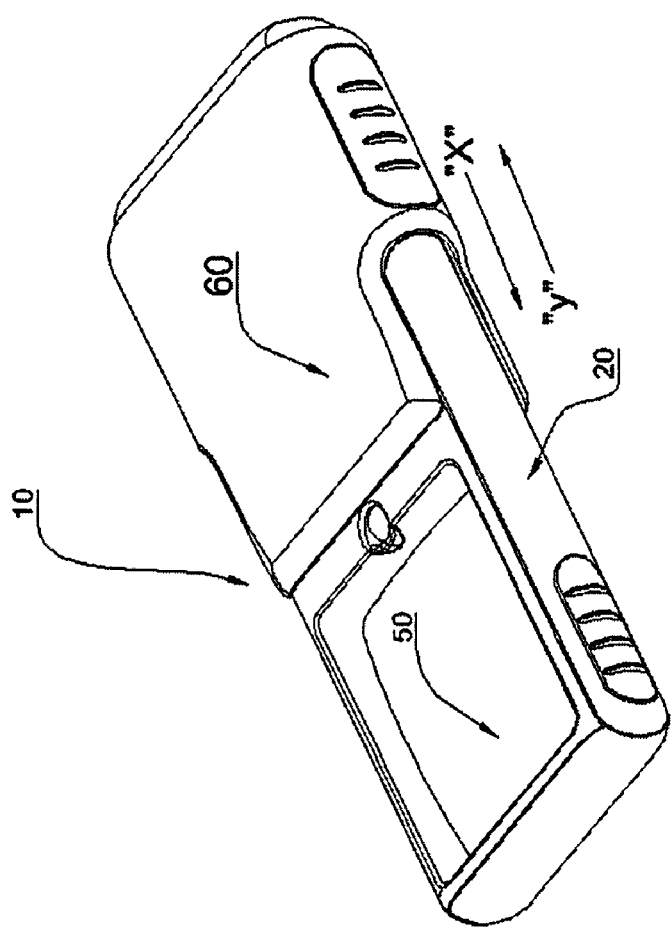
FIG. 1 is a first perspective view of a magnifying assembly with a cover in a retracted position, all constructed in accordance with the present invention.
Figure 2:
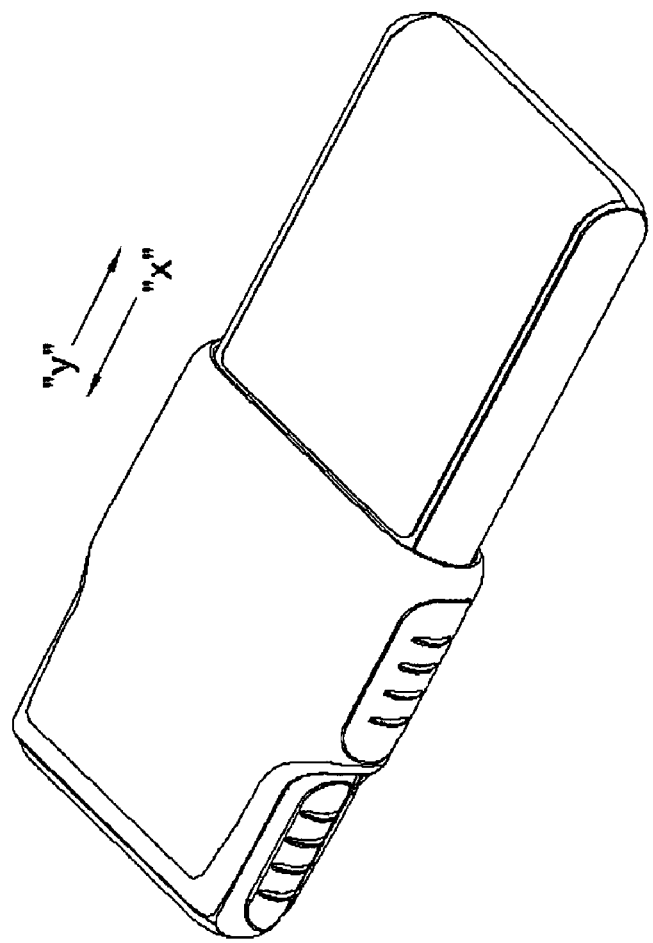
FIG. 2 is a perspective view of the magnifying assembly of FIG. 1, with the cover in a covered position.

Reference is first made to FIGS. 1 and 2 for an overview of a preferred embodiment of the present invention, which illustrates a magnifying assembly, generally indicated at 10.

Magnifying assembly 10, in a first preferred embodiment, comprises a housing generally indicated at 20, a magnifying lens 50 coupled to housing 20, and a cover, generally indicated at 60, which is slidable along housing 20. In accordance with this preferred embodiment, cover 60 is slidable relative to housing 20 in a first direction (see arrow "x" in FIGS. 1, 2) so as to cover at least part of magnifying lens 50 and slidable relative to housing 20 in a second direction (see arrow "y" in FIGS. 1, 2) so as to expose magnifying lens 50.

Figure 3:
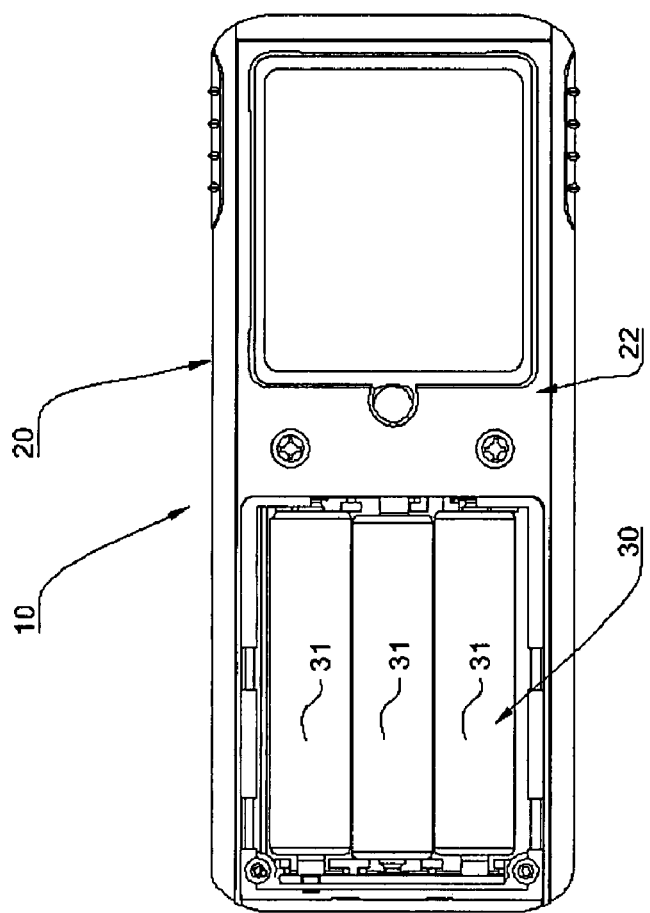
FIG. 3 is bottom plan view of the magnifying assembly of FIGS. 1 and 2, illustrating some interior components thereof.
Figure 4:
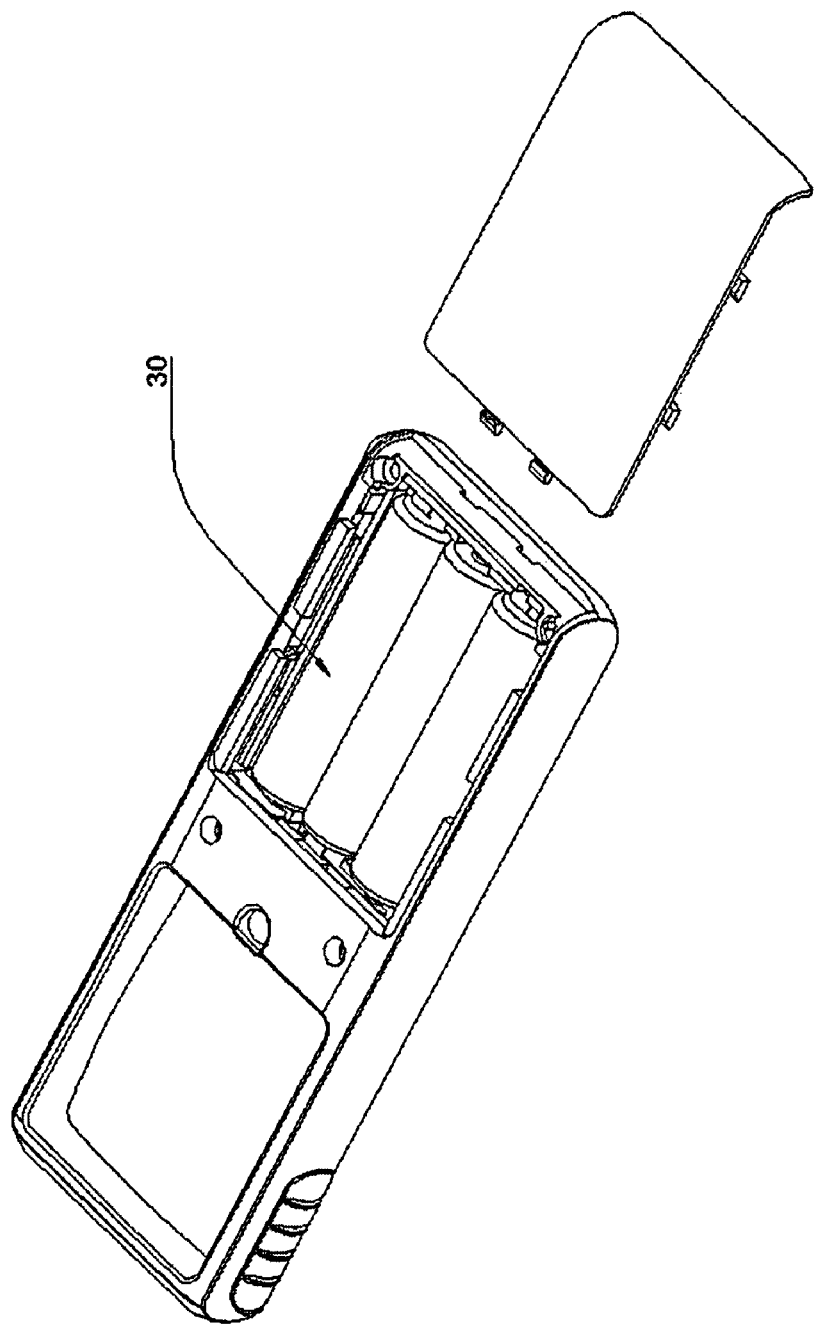
FIG. 4 is a perspective view, from the bottom, of the magnifying assembly of FIGS. 1 and 2, showing yet additional features thereof.

Reference is now also made to FIGS. 3 and 4, wherein it can be seen that housing 20 of magnifying assembly 10 preferably comprises a frame 22 within which magnifying lens 50 is secured and a battery compartment 30. In the preferred embodiment, frame 22 and battery compartment 30 are integrally formed. In a specific embodiment, housing 20 is formed of plastic and frame 22 and battery compartment 30 are integrally formed (i.e. one continuous piece) from molded plastic. A plurality of batteries 31 are also provided as would be understood by one skilled in the art.

In accordance with an objective and advantage of the present invention, it can be seen from an understanding of the foregoing FIGS. 1-4 that frame 22 does not slide or move relative to battery compartment 30. In this way, and as can be seen explicitly in for example in FIGS. 1 and 2, upon the exposure of magnifying lens 50 (e.g. FIG. 1) the length of housing 20 does not change from when magnifying lens 50 was covered by cover 60 (e.g. FIG. 2). Specific details regarding a construction of the cover will provided below.

Figure 6:
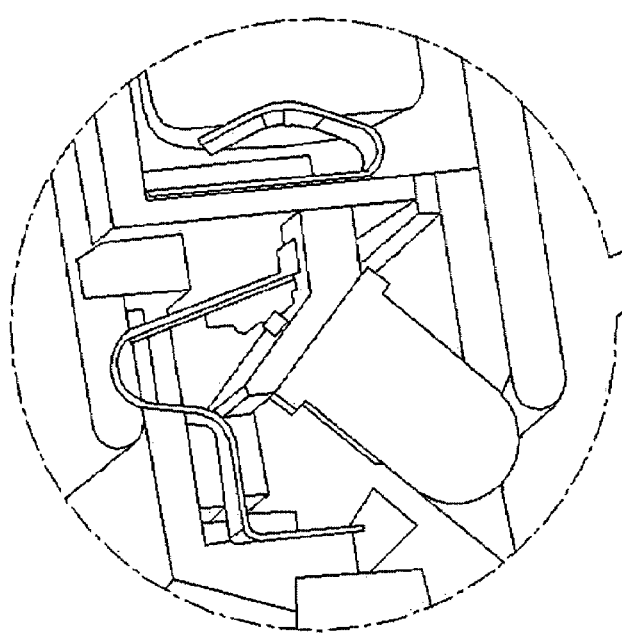
FIG. 6 is an enlarged portion of the magnifying assembly illustrated in FIG. 5.
Figure 5:
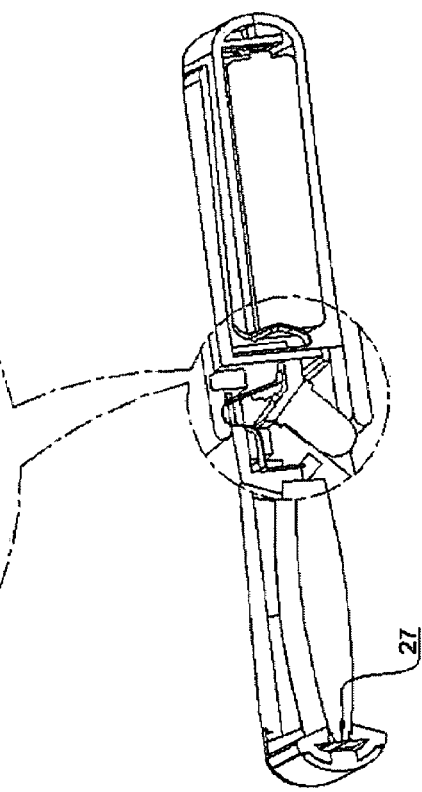
FIG. 5 is a side view of the magnifying assembly constructed in accordance with the present invention, illustrating yet additional features of the present invention.
Figure 7:
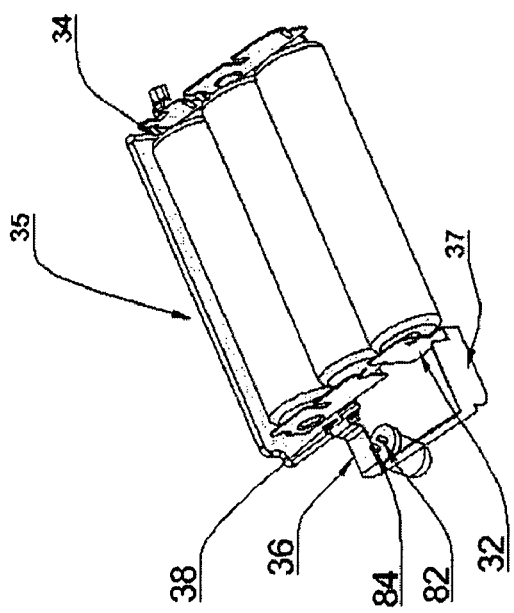
FIG. 7 illustrates a preferred electrical coupling of the power source (e.g. batteries) to the illuminating device (e.g. LED)

In accordance with another objective and advantage of the present invention, an illumination device 80, such as an LED by way of example and not limitation, is provided. Reference may also be made to FIGS. 5-7 in connection therewith. In accordance with the preferred embodiment, illumination device 80 is coupled to housing 20, such as by mounting as would be well-known to one skilled in the art. Preferably, device 80 does not extend beyond the bottom surface of the housing 20; in this way it does not interfere with cover 60 when it moves from its retracted position (FIG. 1) to a closed position (FIG. 2). FIGS. 5 and 6 show a preferred mounting arrangement with specifics being well-known to and within the purview of the ordinarily skilled artisan.

FIG. 7 makes clear a preferred electrical/circuit arrangement, details of which are now provided so as to appreciate further advantages of the present invention, as will be set forth hereinafter.

In particular, illumination device 80 is coupled to first and second light terminals 82, 84. Of course, a commercial illumination device 80 itself may comprise such terminals 82, 84. Further, battery compartment 30 comprises first and second source terminals 32, 34. Second light terminal 84 is electrically coupled to second source terminal 34, such as, for example, via a conductive element (e.g. wire) 35.

To complete the electrical circuit, a conductive resilient member 36 having a first end 37 in electrical coupling/contact with first source terminal 32, and a second end 38 being movable between an engaged position in which the second end is in conductive coupling (e.g. electrical contact) with first light terminal 82 and a disengaged position in which the second spring end 38 is out of electrical contact with first light terminal 82. As will be explained hereinafter, the foregoing assembly provides that when cover 60 is in the retracted position (e.g. FIGS. 1 and 5) so as to expose magnifying lens 50, the second end 38 is in electrical contact with first light terminal 82.

It should be understood that the foregoing electrical arrangement is only one such possibility, and various arrangements for illuminating an LED are within the scope of this invention and the skill of the ordinary artisan. As but one simple alternative, resilient member 36 may have its first end 37 in electrical coupling/contact with first light terminal 82, and a second end being movable between an engaged position in which the second end 38 is in electrical contact with the first source terminal 32 and a disengaged position in which the second end 38 is out of electrical contact with the first source terminal 32. In this way, when cover 60 is in a retracted position so as to expose the magnifying lens 50, the second end 38 is in electrical contact with the first source terminal 32.

Figure 8:
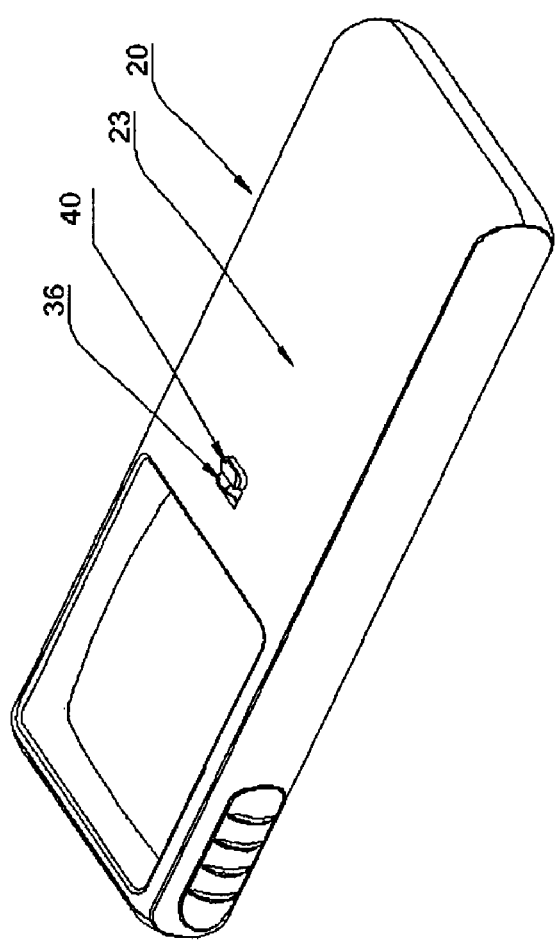
FIG. 8 is a perspective view of the assembly without the cover.

Reference is thus also made briefly to FIG. 8 in combination with the aforementioned figures, for showing a preferred construction whereby part of resilient member 36 extends above a top surface 23 of the housing 20. FIG. 8 also discloses a stopper 40 that extends above top surface 23 of the housing 20. The significance thereof will be disclosed below.

Figure 9:
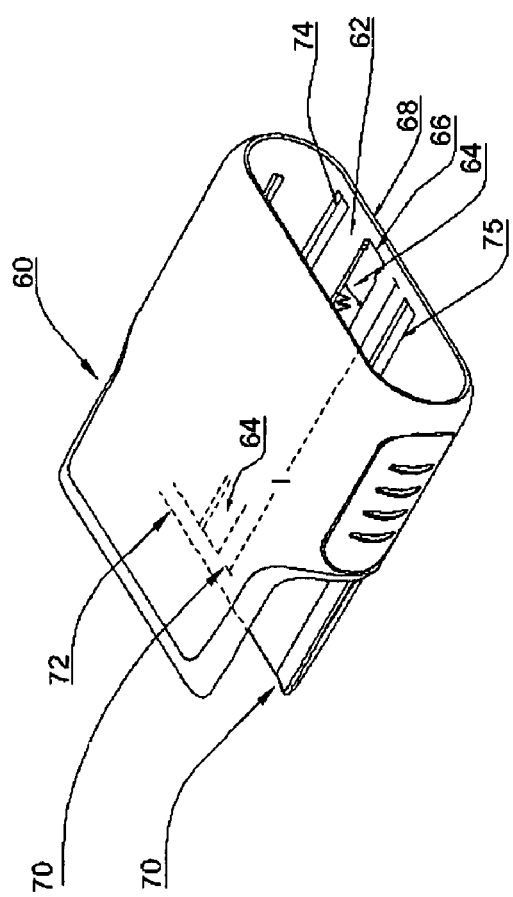
FIG. 9 is a perspective view of the cover.
Figure 10:
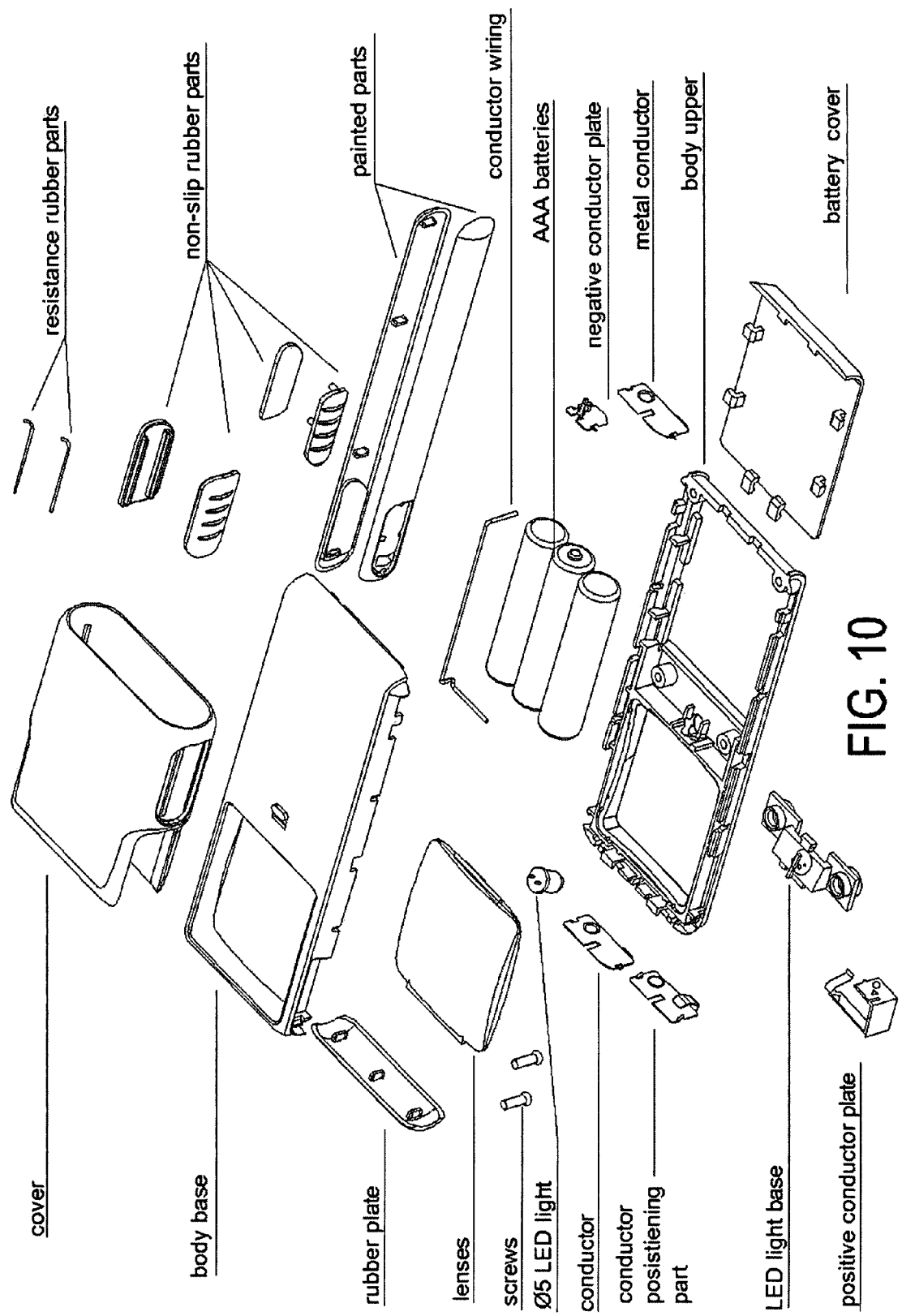
FIG. 10 is an exploded view of the magnifying assembly, showing many of the components thereof for ease of reference.

However, reference is first made to FIG. 9, which shows yet additional details of cover 60 that may not be readily apparent in the earlier figures. For example, cover 60 includes an inside surface 62 which is provided with a channel 64, the length (l) and width (w) of which is dimensioned so that a lip 66 is defined at a first end 68 of cover 60 and a second lip 70 is defined at a second end 72 of the cover. Constructed in this way, when the cover is in the retracted position (FIG. 1), the top surface of lip 70 is aligned with and presses down on resilient member 36 causing the second end 38 to move from its disengaged position to its engaged position, and when cover 60 is not in the retracted position the resilient member 36 is disposed in channel 64 permitting the second end 38 of resilient member 36 to remain in its disengaged position.

As mentioned above, assembly 10 also comprises stopper 40 extending above top surface 23 of housing 20. As should now be understood from the figures, stopper engages/contacts the front edge of lip 66 at the first end 68 of cover 60 when the cover is in its covered position (FIG. 2) and engages the front edge of lip 70 at the second end 72 of the cover when the cover is in its retracted position (FIG. 1) thereby also aligning the top surface of lip 70 with resilient member 36. The lips in conjunction with the stopper prevent cover 60 from becoming decoupled with housing 20 and ensure the proper amount of slidability of cover 60 relative to housing 20. Also, as should be understood, while cover 60 is sliding towards the covered or retracted positions, stopper 40 remains in channel 64 thereby not hindering the sliding of the cover relative to the housing.

FIG. 9 also shows a plurality of rubber members 74, 75 which provide a suitable amount of friction to assist in preventing an unnecessary or undesirable slipping of cover 60 along housing 20. Similar rubber members may be provided on the opposing inside surface of cover 60. Furthermore, in a preferred embodiment, cover 60 is comprised of plastic. And lastly, to be sure, it should be evident that cover 60 encases housing 20 so that part of housing 20 passes through cover 60 as the cover slides in the first and second directions. The foregoing statement is made so as to provide the broadest reasonable interpretation to understand how cover 60 is coupled "to," "with" and/or "on" housing 20.

The figures also illustrate how magnifying lens 50 may be positioned in the housing halves that comprise housing 20; e.g. by forming a channel 27 (see FIG. 5) in which the edges of lens 50 are positioned.

It can thus be seen that the present invention is advantageous in that it provides an improved magnifying assembly that includes a retractable cover so as to expose the magnifying lens, while maintaining a minimal requirement of the size of the assembly itself. Additionally, it can be seen that the present invention provides an improved magnifying assembly that includes a retractable cover so as to expose the magnifying lens, thereby reducing the number of moving parts and reducing the likelihood of breakage or malfunction of the assembly. Still further, as disclosed, the present invention can be manufactured relatively inexpensively and easily using, for example, plastic materials where appropriate.

Lastly, in the preferred embodiment, the lens has 2×-3× magnification, although surely other particular ranges or specific magnifications are contemplated and well within the purview of the skilled artisan.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense. For example, the "ends" of resilient member 36 have been identified in the figures as being located at a particular point in the drawings. This is just for illustrative purposes as the ends (or the specific terminal points) can be located elsewhere while staying within the scope of the invention.

As but another example and in yet an alternative embodiment of the present invention, the magnifying lens need not be placed in the frame as set forth above. For example, the lens may be "rimless" and merely be coupled to the housing by a plastic coupling member or a screw, just to name but two of many examples. The important point therefore is that the magnifying lens does not move relative to the housing, such as the battery compartment, regardless of how the lens may be coupled and/or secured to the housing. Such is to be contrasted with the prior art devices whereby the lens may "pop-up" relative to the battery compartment and/or housing.

It should also be understood that the following claims are intended to cover all of the generic and specific features of the invention described herein and all statements of the scope of the invention that as a matter of language might fall therebetween.

What is claimed is:

1. A magnifying assembly, the magnifying assembly comprising:
    a housing comprising a frame to which a magnifying lens is secured, and a battery compartment;
    a cover slidable along the housing;
    wherein the cover is slidable relative to the housing in a first direction so as to cover at least part of the magnifying lens and slidable relative to the housing in a second direction so as to expose the magnifying lens; and
    wherein the distance between the battery compartment relative to the magnifying lens remains the same regardless of whether the cover slides relative to the housing in the first direction so as to cover at least part of the magnifying lens or slides relative to the housing in the second direction so as to expose the magnifying lens.

2. The magnifying assembly as claimed in claim 1, wherein the frame and battery compartment are integrally formed.

3. The magnifying assembly as claimed in claim 2, wherein the housing is formed of plastic and the frame and the battery compartment are integrally formed from molded plastic.

4. The magnifying assembly as claimed in claim 2, wherein the frame does not slide relative to the battery compartment;
    whereby upon the exposure of the magnifying lens the length of the housing does not change from when the magnifying lens was covered by the cover.

5. The magnifying assembly as claimed in claim 1, wherein the magnifying lens does not move relative to the housing;
    whereby upon the exposure of the magnifying lens the length of the housing does not change from when the magnifying lens was covered by the cover.

6. The magnifying assembly as claimed in claim 1, including a battery compartment, and wherein the magnifying lens is coupled to the battery compartment and further, wherein the magnifying lens does not move relative to the battery compartment;
    whereby upon the exposure of the magnifying lens the length of the housing does not change from when the magnifying lens was covered by the cover.

7. A magnifying assembly, the magnifying assembly comprising:
    a housing comprising a frame to which a magnifying lens is secured, and a battery compartment;
    a cover slidable along the housing;
    wherein the cover is slidable relative to the housing in a first direction so as to cover at least part of the magnifying lens and slidable relative to the housing in a second direction so as to expose the magnifying lens;
    an illumination device, coupled to the housing, wherein the illumination device is coupled to first and second light terminals;
    wherein the battery compartment comprises first and second source terminals;
    wherein the second light terminal is electrically coupled to the second source terminal; and
    a resilient member having a first end in electrical coupling with the first source terminal and a second end, the second end being movable between an engaged position in which the second end is in conductive coupling with the first light terminal and a disengaged position in which the second end is out of electrical contact with the first light terminal;
    wherein when the cover is in a retracted position so as to expose the magnifying lens, the second end is in electrical contact with the first light terminal.

8. A magnifying assembly, the magnifying assembly comprising:
    a housing comprising a frame to which a magnifying lens is secured, and a battery compartment;
    a cover slidable along the housing;
    wherein the cover is slidable relative to the housing in a first direction so as to cover at least part of the magnifying lens and slidable relative to the housing in a second direction so as to expose the magnifying lens;
    an illumination device, coupled to the housing, wherein the illumination device is coupled to first and second light terminals;
    wherein the battery compartment comprises first and second source terminals;
    wherein the second light terminal is electrically coupled to the second source terminal; and
    a resilient member having a first end in electrical coupling with the first light terminal and a second end, the second end being movable between an engaged position in which the second end is in conductive coupling with the first source terminal and a disengaged position in which the second end is out of electrical contact with the first source terminal;
    wherein when the cover is in a retracted position so as to expose the magnifying lens, the second end is in electrical contact with the first source terminal.

9. The magnifying assembly as claimed in claim 7, wherein:
    part of the resilient member extends above a top surface of the housing; and
    an inside surface of the cover includes a channel the length and width of which is dimensioned so that:

when the cover is in the retracted position the cover presses down on the resilient member causing the second end to move from its disengaged position to its engaged position, and when the cover is not in the retracted position the resilient member is disposed in the channel permitting the second end of the resilient member to remain in its disengaged position.

10. The magnifying assembly as claimed in claim 8, wherein:

part of the resilient member extends above a top surface of the housing; and an inside surface of the cover includes a channel the length and width of which is dimensioned so that:

when the cover is in the retracted position the cover presses down on the resilient member causing the second end to move from its disengaged position to its engaged position, and when the cover is not in the retracted position the resilient member is disposed in the channel permitting the second end of the resilient member to remain in its disengaged position.

11. The magnifying assembly as claimed in claim 1, comprising a stopper extending above a top surface of the housing; and wherein an inside surface of the cover includes a channel the length and width of which is dimensioned so that a lip is defined at both a first end and a second end of the cover;

wherein the stopper engages the lip at the first end of the cover when the cover is in a covered position so as to cover at least a part of the magnifying lens and engages the lip at the second end of the cover when the cover is in a retracted position so that the cover is prevented from becoming decoupled with the housing; and wherein while the cover is sliding towards the covered or retracted position, the stopper remains in the channel thereby not hindering the sliding of the cover relative to the housing.

12. The magnifying assembly as claimed in claim 1, wherein the cover is comprised of plastic.

13. The magnifying assembly as claimed in claim 1, wherein the cover encases the housing so that that part of the housing passes through the cover as the cover slides in the first and second directions.

* * * * *